Nov. 2, 1937.        R. H. WHISLER        2,098,076
CLUTCH CONTROL
Original Filed Oct. 13, 1934    4 Sheets-Sheet 2
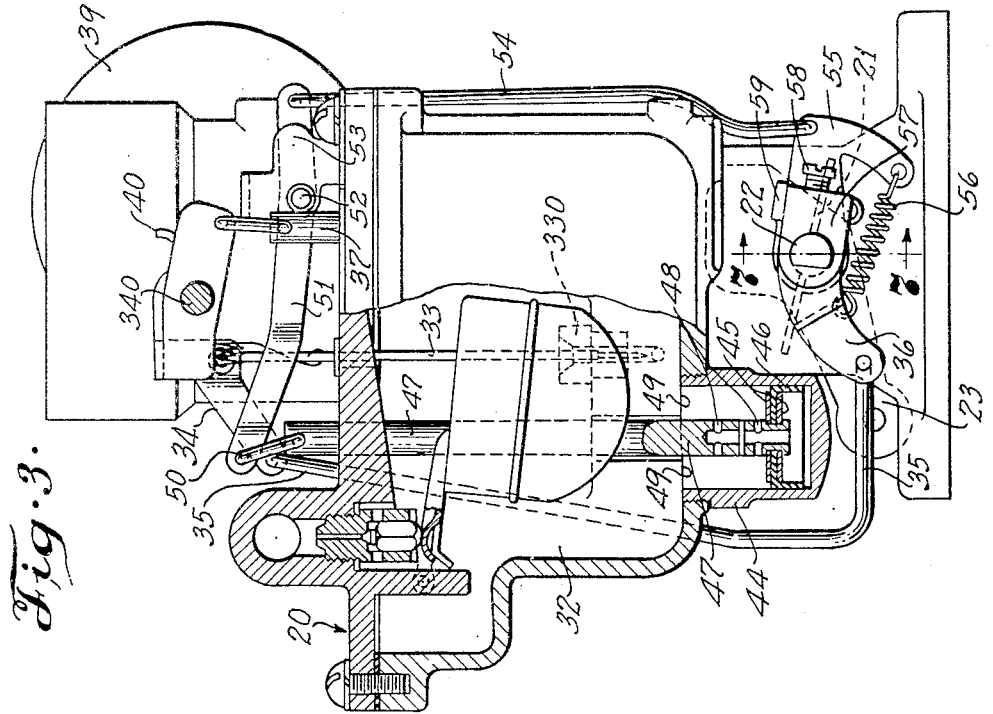
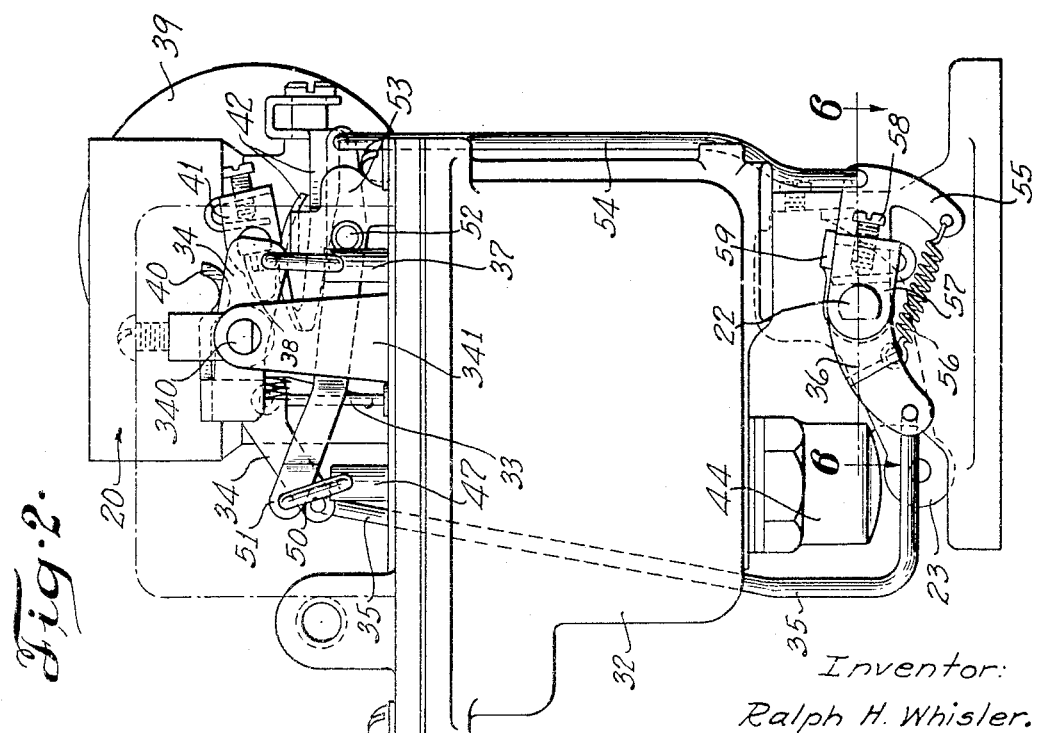
Inventor:
Ralph H. Whisler.
By Donald U. Rich
Attorney Nov. 2, 1937.     R. H. WHISLER     2,098,076
CLUTCH CONTROL
Original Filed Oct. 13, 1934     4 Sheets-Sheet 3
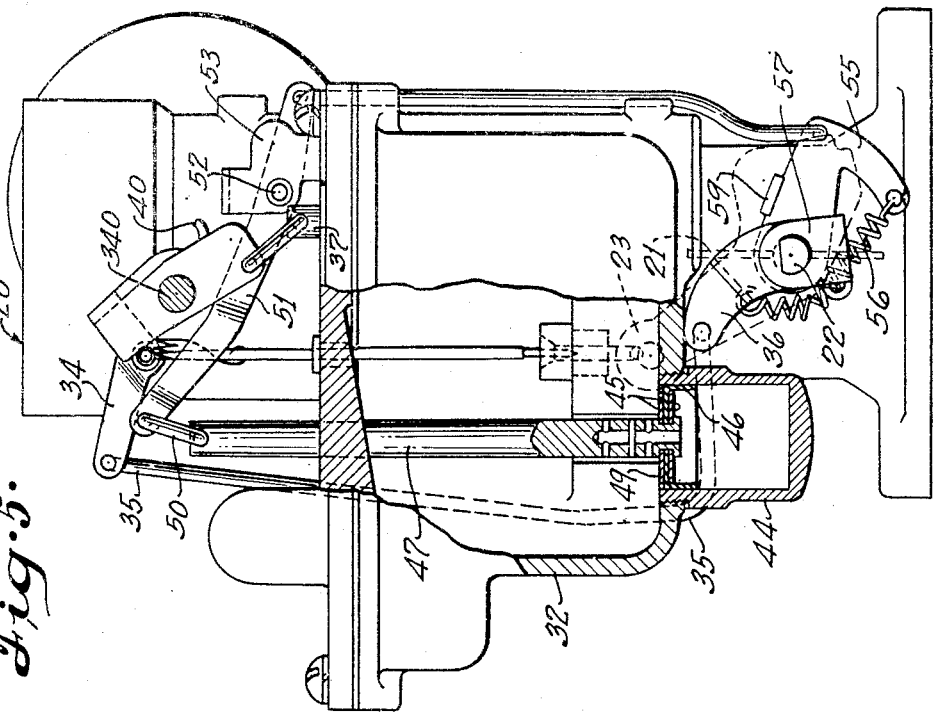
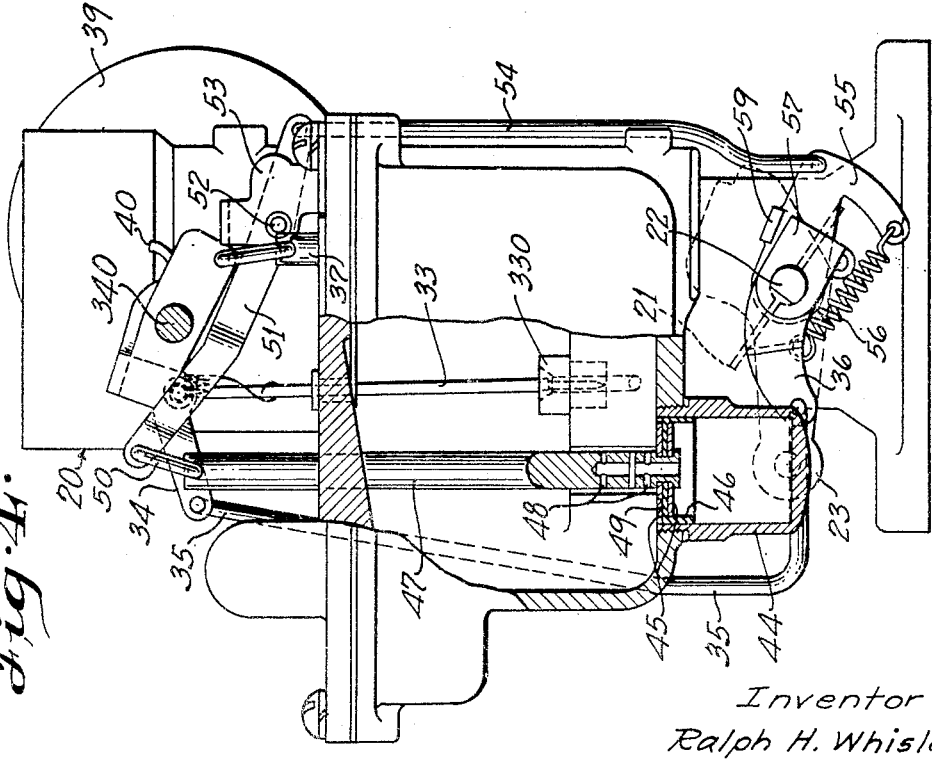
Inventor
Ralph H. Whisler.
By Donald H. Rich
Attorney

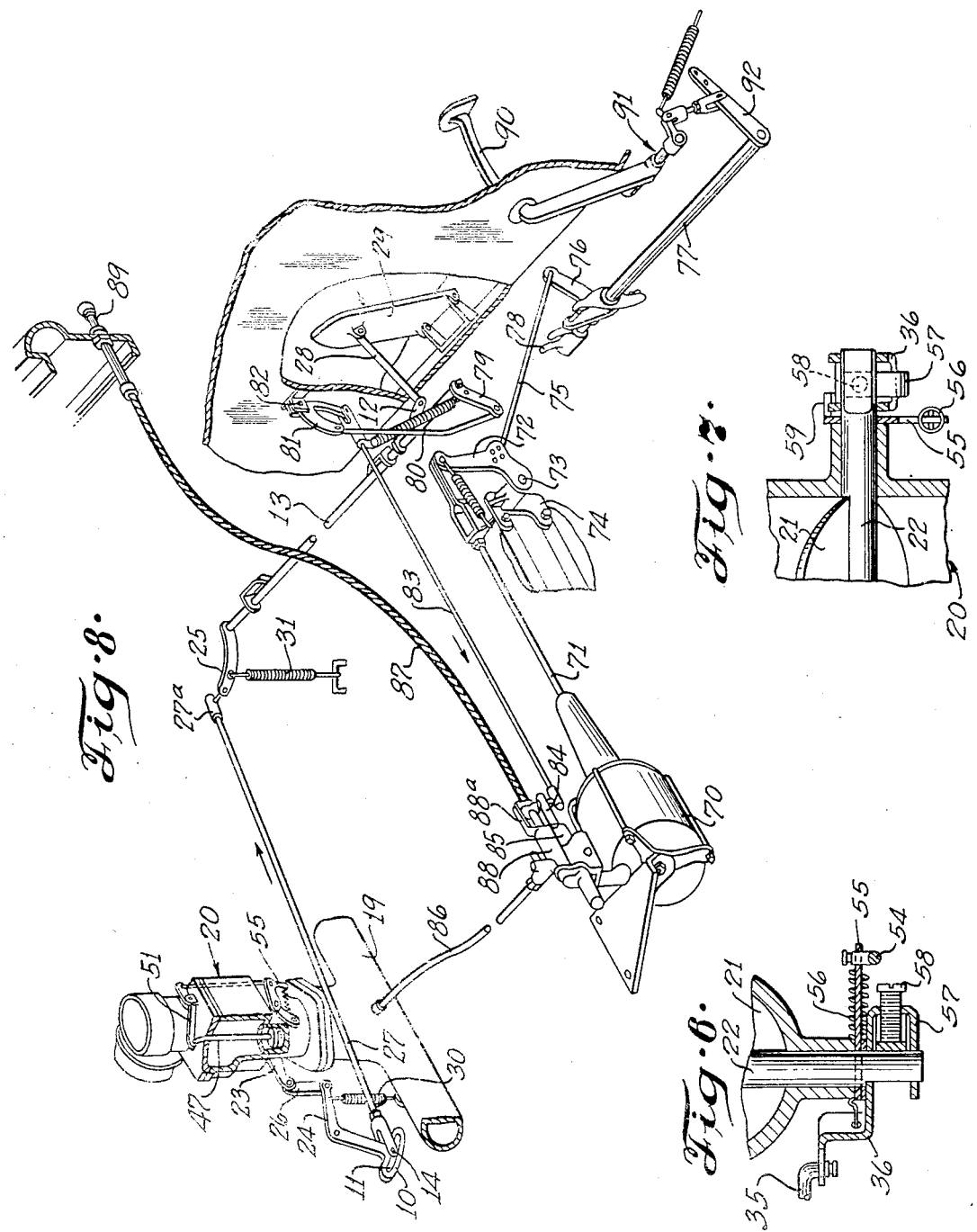

Patented Nov. 2, 1937

2,098,076

UNITED STATES PATENT OFFICE 2,098,076

CLUTCH CONTROL

Ralph H. Whisler, St. Clair Shores, Mich., assignor, by mesne assignments, to Carter Carburetor Corporation, St. Louis, Mo., a corporation of Delaware Original application October 13, 1934, Serial No. 748,197. Divided and this application December 29, 1936, Serial No. 118,053

8 Claims. (Cl. 192—.01)

This invention relates generally to carburetor and vacuum clutch control mechanism and has for its principal objects to provide improved means for controlling the deceleration of the engine when the main carburetor throttle valve is closed and to provide in conjunction therewith, an improved and effective means for controlling the operation of a vacuum actuated clutch by properly timing the engagement and disengagement of the same in relation to the engine acceleration and deceleration so that improved automatic clutch operation will be secured. The present application is a division of a copending application, Serial No. 748,197, filed October 13, 1934.

Considered from one important aspect, the invention is especially adaptable to motor vehicles of the type having a relatively high power-to-weight ratio. Such vehicles have a desirably high rate of acceleration when the throttle valve is opened, but, on the other hand, when the throttle valve is completely closed, are often decelerated at a rate which, under many driving conditions, is undesirably rapid. In order to secure smooth operation, the final shutting off of the power of the engine by the closing of its throttle valve should conform as nearly as possible to the natural loss of momentum of the vehicle; otherwise the progress of the car is likely to be characterized by sudden decelerations which are very disagreeable to the passengers, particularly if the operator suddenly removes his foot from the accelerator pedal. In cars equipped with vacuum operated automatic clutches, it is desirable to prevent a too sudden final closing of the throttle and consequent rapid engine deceleration, since under such conditions an undesirable delay in the disengagement of the clutch often occurs.

An object of the present invention is to provide a delayed action throttle closing mechanism effective to accommodate the time lag in the disengagement of the vacuum controlled clutch when the accelerator pedal is entirely released thereby effectively synchronizing the disengagement of the clutch and the deceleration of the engine and effecting a uniformly smooth operation of the vehicle.

Other objects of the invention will appear in the following description and appended claims, reference being had to the accompanying drawings forming a part of this specification wherein like reference characters designate corresponding parts in the several views.

Fig. 2 is a front elevation of the carburetor.

Fig. 3 is a view similar to Fig. 2 with the float chamber partly in section and certain parts omitted.

Figs. 4 and 5 are views similar to Fig. 3 but showing the parts in different positions.

Fig. 6 is a detail section taken substantially on the line 6—6, Fig. 2.

Fig. 7 is a detail section taken substantially on the line 7—7, Fig. 3.

Fig. 8 is a perspective view, in part diagrammatic, illustrating the carburetor and vacuum clutch assembly together with operating mechanism therefor.

Figure 1:
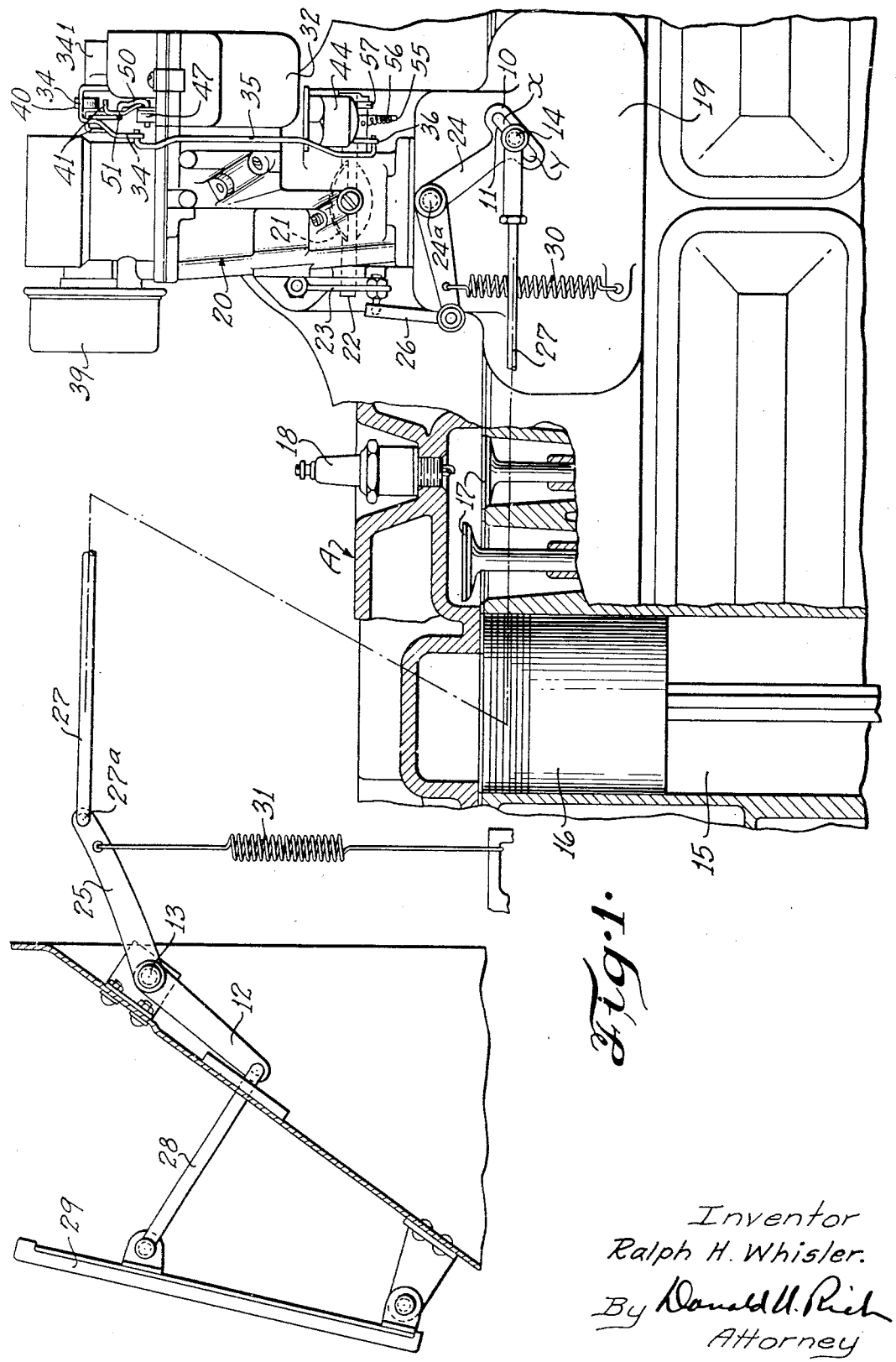
Fig. 1 is a fragmentary view, partly diagrammatic and in section, illustrating portions of the carburetor, control mechanism and power plant.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In Fig. 1 there is shown at A a portion of an automobile engine having a suitable number of cylinders 15, pistons 16, valves 17 and spark plugs 18, and an intake manifold 19 supplied with fuel mixture from a carburetor 20 under the control of a throttle valve 21. The throttle valve 21 is carried by a rock shaft 22 having fast thereon an arm 23, pivotally connected through a link 26 to one end of a bell crank lever 24 pivoted at 24a to the manifold casing. The opposite end of this lever has an enlarged portion 10 provided with an arcuate slot 11 of calculated length within which is slidingly connected for predetermined lost motion a pin 14 carried at the forward end of a link or push and pull rod 27. The opposite end 27a (see Figs. 1 and 8) of this rod is pivoted to the outer end of an arm 25 fixed at its inner end to a rock shaft 13. This shaft may be rocked through the medium of a conventional accelerator pedal 29 pivoted to a bracket secured to the toe-board, the pedal being connected by means of a link 28 to a second arm 12 fixed to the shaft. Suitable return springs 30 and 31 are employed to close the throttle and elevate the accelerator pedal when the latter is released by the driver.

The carburetor 20 herein shown (see also Figs. 2 to 7) for purposes of illustration is, generally speaking, of a well known down draft type having a float chamber 32 and a metering pin 33 for controlling the admission of liquid fuel from the float chamber 32 to the mixing chamber. The metering pin 33 is carried by a lever 34 pivoted at 340 to a bracket 341 on the top of the float chamber and connected by a link 35 to an arm 36 fast on the throttle valve stem 22, whereby the metering pin is retracted to open the fuel supply jet or advanced to close the jet simultaneously with the opening and closing of the throttle valve, respectively. The lever 34 is also connected with the plunger 37 of a fuel pump for injecting a priming or accelerating jet of fuel into the mixing chamber when the throttle is opened. The carburetor shown is further provided with a choke valve controlled by a thermostat located in housing 39 and also controlled from the throttle valve by engagement of a finger 40 on the lever 34 with an arm 41 on the choke valve shaft 38.

Except as hereinafter pointed out, or as they enter into combination with the parts hereinafter described, the parts above referred to specifically constitute no portion of the present invention and may be of any approved construction and arrangement.

In accordance with the present invention, the float chamber 32 has formed in the bottom thereof a dash pot cylinder 44. This cylinder may, if desired, be constructed separately and threaded into the bottom of the float chamber, but when in place constitutes a unitary part of the float chamber and is constantly supplied with liquid from the latter. Working in the cylinder 44 is a dash pot plunger 45 in the form of a piston comprising, in the present instance, an inverted cup-shaped washer 46 carried by a rod 47 drilled to provide suitably restricted ports 48 communicating with the interior of the cylinder at opposite sides of the piston. Upward movement of the piston 45 is limited by shoulders 49 provided by a rib formed on the interior of the float chamber. At its upper end, the rod 47 is connected by a link 50 with the longer arm of a lever 51 pivoted at 52 to a bracket 53 on the top of the float chamber. The shorter arm of the lever 51 is connected by a link 54 with a bell crank arm 55 pivotally mounted to turn freely on the throttle valve shaft 22 adjacent the arm 36, the arm 55 having a downward extension connected with the arm 36 by a spring 56. The arm 36 is formed with a stirrup portion 57 non-rotatably mounted on the throttle valve stem 22 and held in place by a set screw 58. The arm 55 is provided with a lug 59 which, when arms 36 and 35 are in the relative positions shown in Figure 5, is engaged by the top of the stirrup portion 57 of the arm 36.

The position of the parts when the throttle valve is fully closed is shown in Fig. 3. To open the throttle valve and retract the metering pin 33, the throttle valve stem 22 is turned in a clockwise direction as viewed in the latter figures, thereby, through the arm 36, link 35, and lever 34 retracting or elevating the metering pin 33. During the initial portion of this opening movement, the arm 55, under the influence of the spring 56, follows the movement of the arm 36, thereby, through the link 54 and lever 51, raising the dash pot plunger until movement of the piston 45 is arrested by engagement with the shoulders 49. During this operation, the dash pot plunger offers no material resistance to the movement of the parts, since the top of the cylinder 44 is open to the float chamber 32. When the movement of the dash pot plunger is arrested by engagement of the piston 45 with the shoulders 49, as shown in Fig. 6, the movement of the arm 55 is likewise arrested, and during the further opening of the throttle valve the stirrup portion 57 of the arm 36 moves away from the lug 59 until the throttle valve has been fully opened as shown in Fig. 5. Thereafter the throttle valve may be opened and closed, and the metering pin advanced and retracted, between the positions shown in Figs. 4 and 5, without interference or modification of its action by the dash pot. Certain features of the above-described carburetor are covered in copending related applications Serial No. 448,197, filed October 13, 1934 and Serial No. 94,191, filed August 4, 1936.

When the accelerator pedal is released, the throttle return springs 30 and 31, acting through the links and levers above described and the throttle arm 23, turn the throttle valve shaft in a counter-clockwise direction as viewed in Figs. 3, 4 and 5, thereby moving the throttle valve towards closed position and advancing the metering pin 33 downwardly toward the position for maximum restriction of the feed of the fuel to the carburetor mixing chamber. During this closing movement, when the parts reach substantially the position shown in Fig. 4, the part 57 of the arm 36 engages the lug 59 on the arm 55. Movement of arm 55 in a counter-clockwise direction is resisted and retarded by the dash pot whose plunger is forced downwardly in the cylinder 44 by such counter-clockwise movement of the arm 55. The final closing of the throttle valve, as well as the movement of the metering pin 33 into its fully advanced position, is thereby checked and retarded, so that the fuel mixture will continue to be admitted to the engine for a limited time in decreasing amounts substantially proportionate to the natural deceleration of the car, thus preventing the speed of the latter from being abruptly checked.

Referring to Fig. 1, when the accelerator pedal is fully raised as shown in said figure the rod 27 will have been moved forwardly (to the right in said figure) to the limit of its throw, this action being accomplished principally through the relatively heavy main or primary closing spring 31. At this point the connection 14 of the rod will lie at the forward end of the slot, the throttle valve will be in its nearly closed position shown in Fig. 4, and the actuator part 57 will have reached a position substantially or nearly in engagement with the lug 59. Final closing movement of the throttle from this point is accomplished by the secondary closing spring 30, and it will be seen that when the rod 27 has thus reached the limit of its forward travel in closing direction, the bell crank lever will be free to turn further in a closing direction independently of rod 27 and spring 31. This final range of closing movement of bell crank 24 (when the accelerator pedal 29 has been entirely released by the driver) is produced by tension spring 30 and is opposed by the dash pot. During this final movement the part 57 engages lug 59, swings the bell crank lever 55 about its pivot, raises link 54 and through lever 51 and piston rod 47 forces the dash pot piston downwardly within the cylinder against the resistance of the liquid therein, thus effectively retarding the final range of closing of the throttle between its positions shown in Figs. 4 and 3. During this time the spring 56 is preferably free of tension. When the throttle valve has reached its final closed position, see Figs. 1 and 3, the pin 14 at the forward end of rod 27 will occupy a position intermediate the ends of the slot 11, substantially as indicated in Fig. 1. Hence, the forward portion x of this slot represents the allowable travel of bell crank 24 independently of the accelerator pedal connections, and consequently the corresponding independent travel of the throttle valve and dash pot piston. And only during this independent travel of the throttle valve does the dash pot function to resist the closing of the throttle and hence retard deceleration of the engine.

Referring to Fig. 8 it will be seen that the accelerator pedal 29 is connected through the medium of the rock shaft 13 with a vacuum operated unit connected to mechanism for actuating the clutch. This mechanism comprises a suitable cylinder 70 having mounted therein a reciprocating vacuum operated piston. A rod 71 is connected to the piston and is adapted to be reciprocated thereby. This rod is pivoted to a bell crank lever 72 which in turn is pivoted at 73 to a supporting bracket 74. A link 75 connects the bell crank 72 with a crank arm 76 attached to a clutch operating rock shaft 77 having the usual clutch throw-out fingers 78. The clutch unit proper is not shown herein since it may be of any conventional type. The connections between the accelerator pedal 29 and the vacuum unit comprise a crank arm 79 secured to the rock shaft 13, a link 80 connecting this arm with one arm of a bell crank lever 81 pivoted to a fixed bracket 82, and a link or rod 83 connecting the other arm of the bell crank 81 with a reciprocable plunger valve 84 operable within a cylinder 85 having an inlet port communicating through a pipe 86 with the intake manifold 19. The cylinder 85 has a port in communication with the cylinder 70 at one side of its piston and controlled by the plunger valve 84. Movement of the rod 83 in the direction of the arrow will shift the valve 84 into position to shut off the vacuum communication of cylinder 70 with the intake manifold whereby the clutch will be engaged by the usual clutch return spring. The vacuum mechanism for automatically operating the clutch may be rendered ineffective by means of a cut-off valve plunger 88a operating within a cylinder 88 and controlled by a Bowden wire connection 87 to a manually adjustable device 89 on the dash. At this time the clutch will be under the driver's control solely through the clutch pedal 90 and connections 91 between the clutch pedal and a crank arm 92 secured to the rock shaft 77.

As above stated, when the engine is idling with the throttle valve in its fully closed position the pin 14 will occupy an intermediate position within the slot 11, see Figs. 1 and 8. When, therefore, the accelerator pedal 29 is depressed the pin 14 will have a certain idle movement within the slot portion y before the bell crank lever 24 is moved, by the continued depression of the accelerator pedal, to open the throttle valve. During this idle movement, however, of the pin 14 within the slot 11, the connecting rod 83 and vacuum control valve 84 will be retracted so as to close or partially close communication between the intake manifold and the cylinder 70. Thus, the initial opening of the throttle valve by depressing the accelerator pedal is delayed during a predetermined interval of time to permit independent closing movement of the vacuum control valve 84. It has been found that a certain time lag occurs in the engagement of the clutch by the clutch return spring, and this time lag is accommodated by providing the delayed opening of the throttle valve when the accelerator pedal is depressed. This delayed action, however, is not sufficient to prevent the throttle valve opening in time to cause the engine to accelerate and its speed to equal or exceed the car speed to the desired degree when the clutch becomes engaged. From the foregoing it will, therefore, be seen that a lost motion of the actuating rod 27 occurs when the accelerator pedal is initially depressed, permitting an initial independent movement of the vacuum control valve 84 before the throttle valve opens, thereby offsetting the time lag in the vacuum cutting-out within the cylinder 70 preparatory to engagement of the clutch by the clutch return springs.

It will also be seen that the dash pot retarding device as well as the lost motion connection 14, 11 performs an important function in cooperation with the automatic vacuum controlled clutch mechanism for producing a properly timed disengagement of the clutch during deceleration of the engine when the accelerator pedal is released. It has been found that when the control valve 85 is shifted, upon release of the pedal 29 to open vacuum communication between the cylinder 70 and intake manifold a certain time lag or delay occurs in the vacuum becoming effective to retract the piston within the cylinder 70 and thereby to disengage the clutch (against the resistance of its return springs) through the mechanism 71—78. This time lag has resulted frequently in undesirably delaying the clutch disengagement upon rapid engine deceleration resulting often in noticeable jerks and backlash which are objectionable to the passengers. In order to overcome these disadvantages I have provided means whereby the vacuum control valve will be opened and the clutch disengaged before the throttle valve has finally closed and before there has occurred during deceleration such a change in torque conditions as to produce the above mentioned objectional effects. These improvements in operation have preferably been accomplished, by virtue of the present invention, first, by imparting to the throttle valve a final range of closing movement after the vacuum control valve has completed its opening movement, and, second, by retarding this final closing movement of the throttle, thus offsetting the time lag in the vacuum mechanism becoming effective to disengage the clutch. As a result, the clutch will disengage before an approximate point has been reached during the deceleration of the engine where the car tends to drive the engine. From the foregoing, therefore, it will be seen that no undesirable delay in the clutch disengagement occurs when the accelerator pedal is suddenly released and the engine decelerated.

I claim:
1. In combination, a carburetor having a throttle valve, a vacuum controlled device for actuating a clutch, mechanism for controlling said device, joint control means for said valve and said mechanism, and means whereby the last part of the closing movement of said throttle valve is effected independently of said control mechanism after completion of the movement of said joint control means in a direction to close said throttle valve.

2. The combination of a carburetor having a throttle valve, vacuum controlled mechanism for actuating a clutch, an accelerator pedal, a vacuum control valve for controlling said mechanism, means for moving said control valve from said pedal, means for moving said throttle valve from said pedal, and means whereby closing movement of said throttle valve may be continued independently of said control valve after completion of the movement of said accelerator pedal in a direction to close said throttle valve.

3. In combination, a carburetor having a throttle valve, an accelerator pedal, a device connected to said valve for moving the same toward closed position, mechanism connected to said pedal and having a lost motion connection with said device for actuating the same, retarding means adapted to affect the throttle valve only during a final range of closing movement thereof for retarding such closing movement, said device being free to move said valve independently of said mechanism during such final range of closing movement, a vacuum control valve for controlling a vacuum operated clutch mechanism, and means connecting said mechanism to said control valve whereby said final range of closing movement of said throttle is effected independently of said control valve.

4. In combination, a carburetor having a throttle valve, an accelerator pedal, a device for moving said valve toward closed position, mechanism connected to said pedal and having a lost motion connection with said throttle valve for actuating the same, a dash pot having a cylinder communicating with the carburetor float chamber and a piston adapted to affect said throttle valve only during a final range of closing movement thereof for retarding such closing movement, said device being free to move said valve independently of said mechanism during said final range of closing movement, a vacuum control valve for controlling a vacuum operated clutch mechanism, and means connecting said mechanism to said control valve whereby final range of closing movement of said throttle valve is effected independently of said control valve.

5. In combination, a carburetor having a throttle valve for controlling the flow of fuel mixture to an engine, an accelerator pedal, a movable vacuum control valve for an automatic vacuum controlled clutch operating mechanism, and means connected to said pedal and to said valves for simultaneously moving the same upon moving the pedal, the connection between said valves including a lost motion device whereby an initial movement of said pedal in the direction for opening said throttle affects said control valve independently of said throttle and a final movement of said throttle in the closing direction is effected independently of said control valve.

6. The combination in a carburetor of a throttle valve for controlling the flow of fuel mixture to an engine, an accelerator pedal, a movable vacuum control valve for an automatic vacuum controlled clutch operating mechanism, a common means connected to said pedal and to said valves for simultaneously moving the same upon moving the pedal, and mechanism whereby movement is imparted to the control valve independently of and in advance of the movement of the throttle valve when the pedal is initially moved to accelerate the engine and also whereby a final closing movement is imparted to the throttle valve independently of and after final movement of the control valve during the deceleration of the engine.

7. In combination, a carburetor having a throttle valve for controlling the flow of fuel mixture to an engine, an accelerator pedal, a movable vacuum control valve for an automatic vacuum controlled clutch operating mechanism, means connected to said pedal and to said valves for simultaneously moving the same upon movement of said pedal, mechanism whereby movement is imparted to said control valve independently of and in advance of the movement of the throttle valve when the pedal is initially moved to accelerate the engine and also whereby a final closing movement is imparted to the throttle valve independently of and after final movement of the control valve during the deceleration of the engine, and a dash pot device for retarding said final closing movement of the throttle valve.

8. In combination, a carburetor having a throttle valve for controlling the flow of fuel mixture to an engine, an accelerator pedal, a movable vacuum control valve for an automatic vacuum controlled clutch operating mechanism, means connecting to said pedal and to said valves for simultaneously moving said valves upon movement of said pedal, means whereby a final range of closing movement is imparted to said throttle valve independently of said connecting means and after final movement of said control valve, and means for retarding said throttle valve during said final range of closing movement.

RALPH H. WHISLER.